United States Patent [19]

Sasaki et al.

[11] Patent Number: 4,910,533

[45] Date of Patent: Mar. 20, 1990

[54] COLOR THERMAL PRINTER

[75] Inventors: Hiromu Sasaki; Fumikazu Nagano, both of Yamatokoriyama, Japan

[73] Assignee: Sharp Kabushiki Kaisha, Osaka, Japan

[21] Appl. No.: 235,447

[22] Filed: Aug. 23, 1988

[30] Foreign Application Priority Data

Aug. 26, 1987 [JP] Japan .......................... 62-129470[U]

[51] Int. Cl.⁴ .............................................. G01D 15/00

[52] U.S. Cl. .................................. 346/151; 346/240.4

[58] Field of Search ............ 346/51, 76 PH; 400/120, 400/240, 240.1, 240.2, 240.3, 240.4

[56] References Cited

U.S. PATENT DOCUMENTS 4,517,590 5/1985 Nagashima et al. .......... 346/76 PH

*Primary Examiner*—Arthur G. Evans

*Attorney, Agent, or Firm*—Birch, Stewart, Kolasch & Birch

[57] ABSTRACT

A color thermal printer of a type which utilizes any one of ink ribbons of different color combination, which comprises a different identifiers provided on and peculiar to each of the different ink ribbons and descriptive of the color combination of the respective ink ribbon; and a detecting system cooperable with any one of the identifiers for detecting, and providing an output signal indicative of, one of the ink ribbons of different color combination which is actually mounted on the printer. The output signal from the detecting means is utilized to instruct the thermal printer that the ink ribbon of the particular color combination has actually been mounted on the printer.

12 Claims, 2 Drawing Sheets

COLOR THERMAL PRINTER

BACKGROUND OF THE INVENTION

1. Field of the Invention

The present invention generally relates to a color thermal printer of a type which utilizes a color ink ribbon having ink areas of different color alternating over the length thereof for the reproduction of a color image on a sheet material.

With the color thermal printer to which the present invention pertains, an image of a desired color can be obtained on the sheet material by successively transferring thermally fusible ink pigments of different color from a web of pigment carrier, forming a part of the color ink ribbon, onto the sheet material so as to superimpose with each other thereby to permit mixture of these different colors to represent the desired color. However, the term "color thermal printer" herein referred to for the purpose of the present invention should not be construed as limitative of the printer having only the capability of printing an image in a plurality of colors which solely depends on the type of ink ribbon. For example, when a monochromatic, for example, black, ink ribbon is used, the color thermal printer can give a print-out of a black image, but when a multi-color ribbon is used, it can give a print-out of a colored image.

2. Description of the Prior Art

A variety of color thermal printers are available in the commercial market. An example of the prior art color thermal printers is shown in FIG. 3 of the accompanying drawings in schematic block representation.

The illustrated prior art color thermal printer comprises a reader unit including an image scanner 21 for reading, for example, a color document and for providing a data descriptive of the color document and a memory 22 for the storage of the data fed from the image scanner 21, and a printer unit including a printer control 23, a printer drive circuit 24, a thermal printing head 25, a particular color ink ribbon 26, a platen 27 and a platen drive motor 28 drivingly coupled with the platen 27.

The color ink ribbon 26 utilizable in the color thermal printer is currently available in a number of different types: A first one of these types is a three-color ink ribbon comprised of a length of pigment carrier sheet and cyclically alternating ink areas each including three ink layers of three different colors, for example, yellow, magenta and cyan, laid over the entire length thereof. A second one of these types is a four-color ink ribbon comprised of a length of pigment carrier sheet and cyclically alternating ink areas each including four ink layers of four different colors, for example, yellow, magenta, cyan and black, laid over the entire length thereof. A third one of these types is a monochromatic ink ribbon comprised of a length of pigment carrier sheet and a monochromatic, for example, black, ink layer laid over the entire length thereof.

Once a particular type of ink ribbon is mounted in the color thermal printer, the actual printing is carried out by the thermal printing head 25 in dependence on the data supplied from the memory 22. Where the ink ribbon actually mounted is either the first type or the second type, some or all of the pigments of the different colors are successively transferred from the associated ink layers onto a sheet material so as to superimpose one over the other to give a particular color substantially faithful to the color connoted by the data fed from the reader unit to the printer unit.

The first to third types of ink ribbon referred to above are in practice interchangeably used depending on the purpose for which the printing is desired.

Accordingly, where these different types of ink ribbon are available for one and the same color thermal printer, the user of the thermal printer is required to provide to the printer control instructions indicative of a particular one of these types that is actually loaded on the printer. In other words, according to the prior art color thermal printer, the user of the printer must manually input from a printer control panel to the printer control a command indicative of the particular one of these types of ink ribbon each time one type of ink ribbon is replaced with another one of the types, or the printer will fail to give an intended printing result.

One problem with the prior art color thermal printer is that, in spite of the requirements of the printer to be instructed as to the type of ink ribbon actually loaded thereon, the user of the printer often forgets to provide the necessary command to the printer control. This of course results in the improper printing result or the failure of the printer to operate properly.

SUMMARY OF THE INVENTION

The present invention has been devised with a view to substantially eliminating the above discussed problem inherent in the prior art color thermal printer and has for its essential object to provide an improved color thermal printer operable with any one of different types of color ink ribbon, wherein an inexpensive means is provided for detecting and automatically providing a particular one of these types that is actually loaded on the printer to the printer control.

In order to accomplish the above described object, these is provided in accordance with the present invention a color thermal printer of a type which utilizes any one of ink ribbons of different color combination, which comprises a different identifier means provided on and peculiar to each of the different ink ribbons and descriptive of the color combination of the respective ink ribbon and a detecting means cooperable with any one of the identifier means for detecting either electrically or optically, and providing an output signal indicative of, one of the ink ribbons of different color combination which is actually mounted on the printer. The output signal from the detecting means is utilized to instruct the thermal printer that the ink ribbon of the particular color combination has actually been mounted on the printer and, for this purpose, it may be supplied to the printer control generally used in the thermal printer.

Considering the availability of the first to third types of ink ribbons as hereinbefore discussed, and assuming that one of the first to third types of ink ribbons, for example, the second type, is actually mounted on the printer in a manner known per se, the detecting means detects either electrically or optically the associated identifier means provided on and peculiar to the second type of ink ribbon thereby to provide the output signal to the printer control wherefore any possible erroneous operation of the printer which would result from the difference between the type of ink ribbon actually mounted and the type of ink ribbon identified by the identifying means can be advantageously avoided.

BRIEF DESCRIPTION OF THE DRAWINGS

This and other objects and features of the present invention will readily be understood from the following description taken in conjunction with a preferred embodiment thereof with reference to the accompanying drawings, in which.

DETAILED DESCRIPTION OF THE EMBODIMENT

Figure 1:
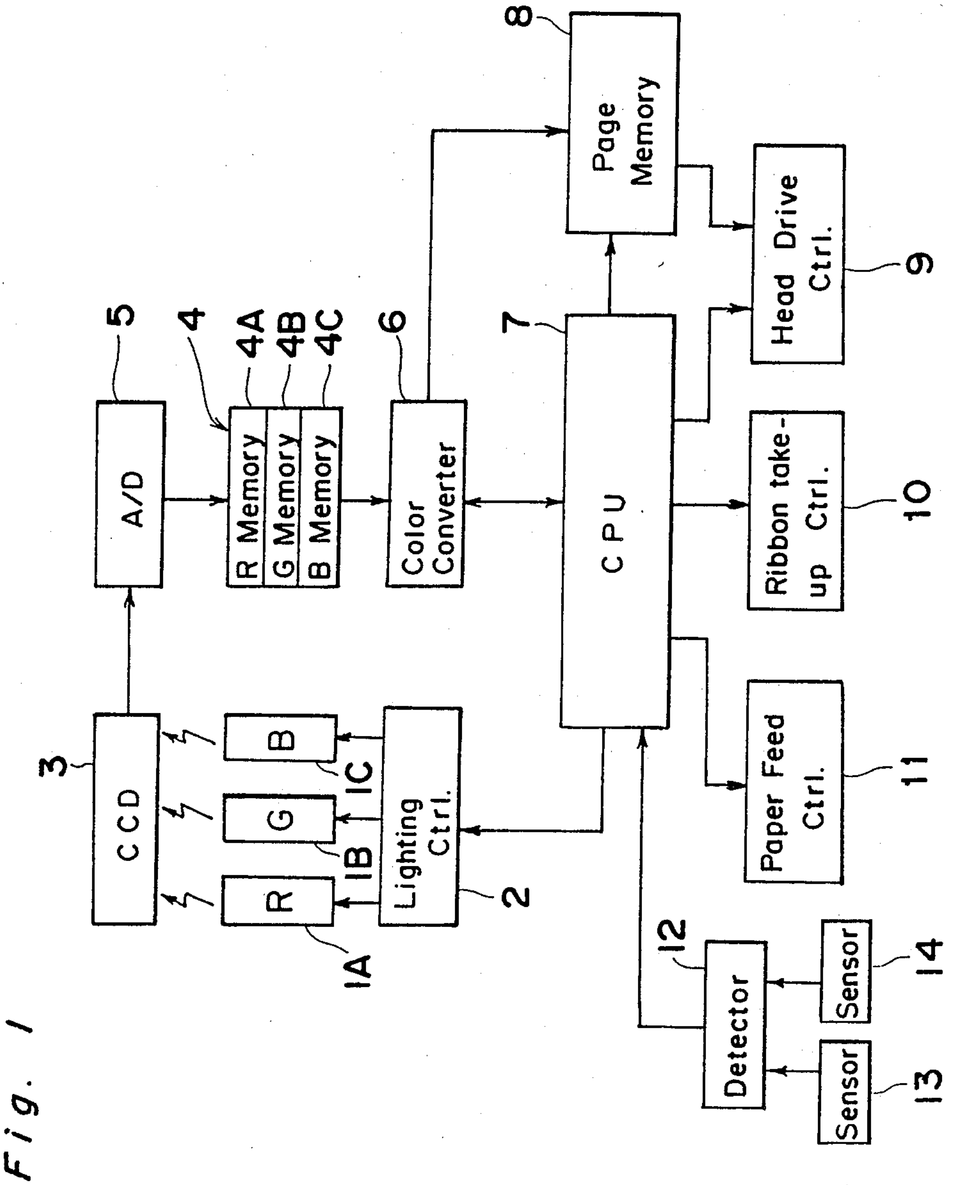
FIG. 1 is a block circuit diagram showing a color thermal printer embodying the present invention.

Referring first to FIG. 1 which illustrates a color thermal printer embodying the present invention, the thermal printer shown therein comprises R, G, and B light sources 1A, 1B and 1C capable of emitting red, green and blue light beams, respectively, towards a document (not shown); a lighting control circuit 2 adapted to control the R, G and B light sources 1A, 1B and 1C so that the light sources 1A, 1B and 1C can be sequentially and cyclically energized in a time sharing manner to emit the red, green and blue light beams; and a CCD image sensor 3 for sensing the R, G and B light beams which have been sequentially and cyclically reflected from the document and for photoelectrically converting the R, G and B light beams into respective R, G and B read-out signals which are sequentially outputted therefrom. The R, G and B read-out signals emerging from the image sensor 3 are, after having been converted into respective digital R, G and B read-out signals by an analog-to-digital converter 5, supplied to a memory unit 4 having R, G and B memory areas 4A, 4B and 4C for the storage of the digital R, G and B read-out signals, respectively. The memory unit 4 is in turn connected with a color converter 6 operable to perform a color conversion so that the R, G and B colors represented by the associated read-out signals can be converted into yellow, magenta and cyan, or respective signals descriptive of yellow, magenta, cyan and black, respectively, depending on the type of ink ribbon actually mounted on the printer as will be described later.

The illustrated printer also comprises a central processing unit 7 to which the lighting control circuit 2, the color converter 6, a page memory 8, a thermal printer head drive control circuit 9, a ribbon take-up control circuit 10, a paper feed control circuit 11 and a detector 12 are connected.

The detector 12 is in turn connected with first and second sensors 13 and 14 both utilized to identify a particular one of the different types of ink ribbons that is actually mounted on the printer in a manner which will now be described.

Figure 2:
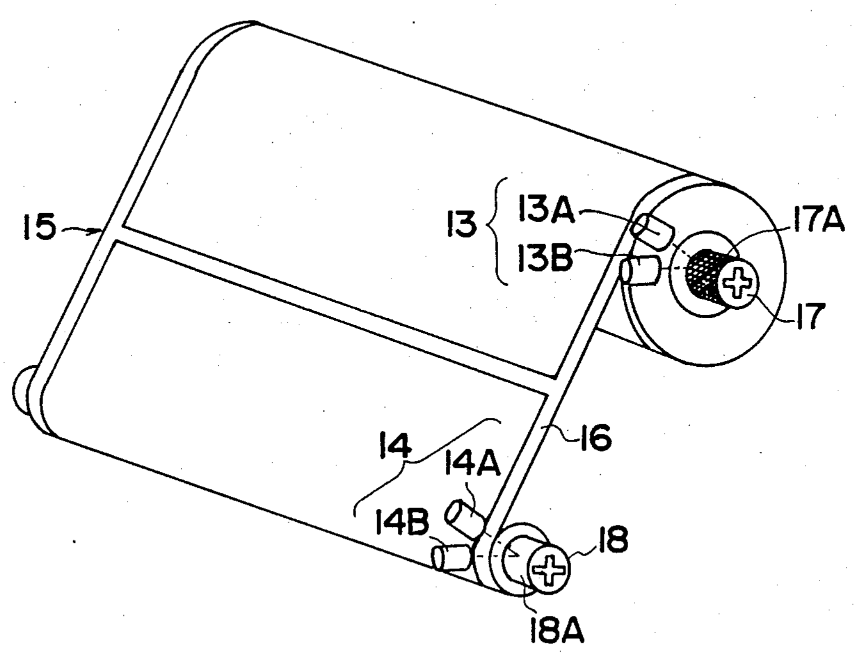
FIG. 2 is a schematic perspective view of one of different types of ink ribbons which can be utilized in the practice of the present invention.
Figure 3:
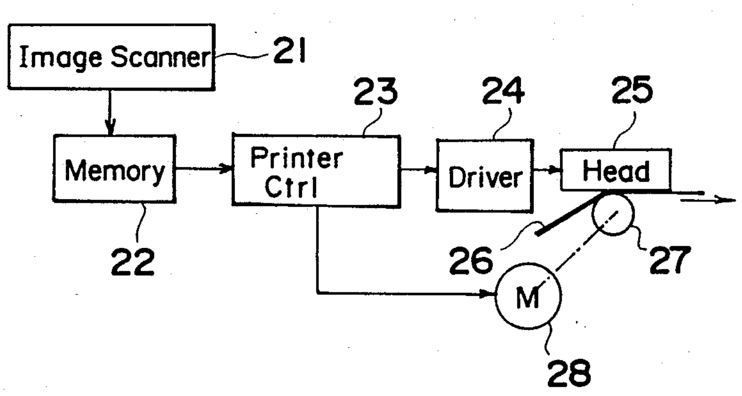
Fig. 3 Prior Art
FIG. 3 is a block diagram showing the prior art color thermal printer.

Referring now to FIG. 2, each of the different types of ink ribbons generally identified by 15 comprises a strip of pigment carrier 16 secured at its opposite ends to first and second, generally elongated core members 17 and 18. Each of these core members has a length greater than the width of the pigment carrier strip 16 so that the opposite ends thereof can protrude axially outwardly from turns of the pigment carrier strip 16 around the respective core member. As shown, at least one end of each of the core members 17 and 18 has a respective identifier 17A or 18A formed or marked thereon. Each identifier 17A or 18A may be in the form of a layer of paint of a particular color, a knurled surface area, or splined grooves, or a combination thereof, which is formed on the peripheral surface of such one end of the respective core member 17 or 18. The identifier 17A and 18A on the respective core members 17 and 18 may be identical with or different from each other. More specifically, as can be understood from the subsequent description, in accordance with the present invention, a combination of identical or different identifiers 17A and 18A is utilized to identify a particular type of ink ribbon 15.

For example, assuming that each identifier 17A and 18A is employed in the form of the paint layer, and if the paint layers on the respective first and second core members 17 and 18 represent a combination of white color, the ink ribbon 15 can be identified as the second type II (four-color ribbon); if the paint layers on the first and second core members 17 and 18 represent a combination of black and white color, the ink ribbon 15 can be identified as the first type I (three-color ribbon); and if they represent a combination of black color, the ink ribbon 15 can be identified as the third type III (monochromatic ribbon). This is tabulated below.

| | Ribbon Type | | |
|---|---|---|---|
| | Type II | Type I | Type III |
| Identifier 17A | White | Black | Black |
| Identifier 18A | White | White | Black |

So far illustrated in FIG. 2, the first core member 17 is shown to have the identifier 17A in the form of the black paint layer and the second core member 18 is shown to have the identified 18A in the form of the white paint layer, signifying that the illustrated ink ribbon 15 is the first type I of ink ribbon.

As hereinbefore discussed, the first type I of ink ribbon is a three-color ink ribbon wherein the pigment carrier strip 16 has cyclically alternating ink areas each including three ink layers of yellow, magenta and cyan deposited over the entire length thereof. The second type II of ink ribbon is a four-color ink ribbon wherein the pigment carrier strip 16 has cyclically alternating ink areas each including four ink layers of yellow, magenta, cyan and black deposited over the entire length thereof. The third III type of ink ribbon is a monochromatic ink ribbon wherein the pigment carrier strip 16 has a monochromatic, for example, black, ink layer deposited over the entire length thereof. In each of these types I and II except for the third type III, each ink layer has a surface area corresponding to one-page sheet of the document.

Referring to FIGS. 1 and 2, the first sensor 13 is positioned in the vicinity of the identifier 17A on the first core member 17 and includes a light emitter 13A for emitting a beam of light towards the identifier 17A and a light sensing element 13B for sensing the beam of light which has been emitted from the light emitter 13A and subsequently reflected back from the identifier 17A. Similarly, the second sensor 14 is positioned in the vicinity of the identifier 18A on the second core member 18 and includes a light emitter 14A for emitting a beam of light towards the identifier 18A and a light sensing element 14B for sensing the beam of light which has been emitted from the light emitter 14A and subsequently reflected back from the identifier 18A.

Outputs from the light sensing elements 13B and 14B are applied to the detector 12 by which the type of ink ribbon actually mounted on the printer can be identified in dependence on a combination of the light sensing elements 13B and 14B and, thus, the combination of colors of the identifiers 17A and 18A. An output from the detector 12 descriptive of the particular type of ink ribbon detected as actually mounted on the printer is in turn supplied to the central processing unit 7 which may be employed in the form of a microcomputer.

In response to the output from the detector 12, the central processing unit 7 selects one of a number of color printing modes equal in number to the number of the types of ink ribbons available, for example, three color printing modes so far illustrated, under which the printer can be operated. These color printing mode may include a four-color printing mode, a third-color printing mode and a single color printing mode. The central processing unit 7, after having selected one of the color printing modes under which the printer operates, controls the color converter 6, the page memory 8, the head drive control circuit 9, the ribbon take-up control circuit 10 and the paper feed control circuit 11 to make them operate in a manner appropriate to the selected color printing mode so that, in accordance with a known thermal transfer process, ink deposits of different colors in each ink area, or ink deposits of black color, can be transferred from the pigment carrier strip 16 onto a recording paper.

More specifically, where the printer is set under the four-color printing mode, Y (yellow), M (magenta), C (cyan) and B (black) data are successively introduced from the color converter 6 into the central processing unit 7 and the page memory 8. The central processing unit 7 when receiving the Y data instructs the ribbon take-up control 10 to drive one of the core members 17 or 18 of the second type II of ink ribbon to bring the yellow ink layer in one of the ink areas in the pigment carrier strip 16 into alignment with an area of the recording paper which has been brought to a predetermined printing position by the paper feed control 11 in response to a command from the central processing unit 7. At the same time, in response to a similar command from the central processing unit 7, a thermal printing head is energized to transfer yellow ink deposits onto that area of the recording paper. Similar operations take place in response to the subsequent M, C and B data sequentially supplied to the central processing unit 7 from the color converter 6 and, consequently, the Y, M, C and B ink deposits are transferred onto the same area of the recording paper in superimposed relationship with each other to give a desired color.

When the printer is set under the three-color printing mode, only the Y, M and C data are outputted from the color converter 6 to the central processing unit 7 and, therefore, the printing of black color does not take place. Similarly, when the printer is set under the single color printing mode, only the B data is outputted from the color converter 6 to the central processing unit 7 and, therefore, the superimposed printing of Y, M and C colors does not take place.

Thus, in the color thermal printer embodying the present invention, where the second type II of ink ribbon is actually mounted, the first and second sensors 13 and 14 detects the identifiers 17A and 18A on the first and second core members 17 and 18, respectively, and the detector 12 processes the respective outputs from the first and second sensors 13 and 14 to provide an intelligence signal necessary to inform the central processing unit 7 of the use of the second type II of ink ribbon so that the central processing unit 7 can, in response to the intelligence signal, set the printer under the corresponding four-color printing mode. Where the second type II of ink ribbon is replaced with the first type I of ink ribbon, the first and second sensors 13 and 14 detects the identifiers 17A and 18A on the first and second core members 17 and 18, respectively, and the detector 12 processes the respective outputs from the first and second sensors 13 and 14 to provide a different intelligence signal necessary to inform the central processing unit 7 of the use of the first type I of ink ribbon so that the central processing unit 7 can, in response to the different intelligence signal, set the printer under the corresponding three-color printing mode. Similarly, where the third type III of ink ribbon is mounted on the printer, a still different intelligence signal is outputted from the detector 12 to the central processing unit 7 whereby the printer can be set under the single color printing mode.

Although the present invention has been fully described in connection with the preferred embodiment thereof with reference to the accompanying drawings, it is to be noted that various changes and modifications are apparent to those skilled in the art. By way of example, while each of the identifiers 17A and 18A has been shown and described as formed on the end of the associated core member 17 or 18, it may be formed on each side marginal area of the pigment carrier strip 16.

Again, although each ink layer in each ink area on the pigment carrier strip 16 of any one of the types I to III has been shown and described as having a surface area corresponding to one-page area of the document, it may not be always limited thereto and may be in the form of a band of substantial width extending widthwise of the pigment carrier strip 16.

Accordingly, such changes and modifications are to be understood as included within the scope of the present invention as defined by the appended claims unless they depart therefrom.

What is claimed is:

1. A color thermal printer of a type which utilizes any one of ink ribbons of different color combination, which comprises:

a different identifier means provided on and peculiar to each of the different ink ribbons and descriptive of the color combination of the respective ink ribbon; and an optical detecting means cooperable with any one of the identifier means for detecting, and providing an output signal indicative of, one of the ink ribbons of different color combination which is actually mounted on the printer, said output signal from the optical detecting means being utilized to instruct the thermal printer that the ink ribbon of the particular color combination has actually been mounted on the printer.

2. The color thermal printer as claimed in claim 1, further comprising red, green and blue light sources and a light control means for energizing said red, green and blue lights sequentially in a time sharing manner.

3. The color thermal printer as claimed in claim 2, further comprising a CCD for sensing the red, green and blue lights emitted from said red, green and blue lights and reflected from a document.

4. The color thermal printer as claimed in claim 3, further comprising red, green and blue memory means for memorizing red, green and blue signals as produced from the CCD.

5. The color thermal printer as claimed in claim 1, wherein any one of the ink ribbons of different color combination comprises a pair of core members and a length of pigment carrier strip secured at its opposite ends to the core members, respectively, and wherein said identifier means comprises paint layers formed on the core members, respectively.

6. The color thermal printer as claimed in claim 2, wherein each of the core members has a length greater than the width of the pigment carrier strip and the respective paint layer is formed on one end of the associated core member protruding from turns of the pigment carrier strip.

7. The color thermal printer as claimed in claim 5, wherein the optical detecting means includes a light emitting element and a light receiving element for each of the paint layers on the core members, said light emitting element projecting a beam of light toward the paint layer and said light receiving element adapted to receive the beams of light reflected from the paint layer, and a detector circuit adapted to receive signals from the light receiving elements and to provide an output signal indicative of the ink ribbons of the particular color combination.

8. A color thermal printing system comprising:

a color ink ribbon including, an identification means provided on said color ink ribbon descriptive of the particular type of color ink ribbon;

a color thermal printer for receiving said color ink ribbon and including, optical detecting means responsive to said identification means for providing an output signal indicative of the particular type of color ink ribbon; and processing means responsive to said output signal for instructing the color thermal printer of the particular type of color ink ribbon.

9. The color thermal printing system as claimed in claim 8, wherein the color ink ribbon further comprises core members secured at opposite ends thereof wherein both core members include elongated core members which protrude outwardly from the color ink ribbon and wherein said identification means is formed on said elongated core members.

10. The color thermal printing system as claimed in claim 9 wherein the identification means comprises paint layers formed on said elongated core members.

11. The color thermal printing system as claimed in claim 9 wherein the identification means comprises said elongated core members with grooves formed thereon.

12. The color thermal printing system as claimed in claim 8 which utilizes any of at least three color ink ribbons of different color combination.

* * * * *